No. 609,699. Patented Aug. 23, 1898.
S. PEARSON.
NECK YOKE ATTACHMENT.
(Application filed Apr. 4, 1898.)
(No Model.)
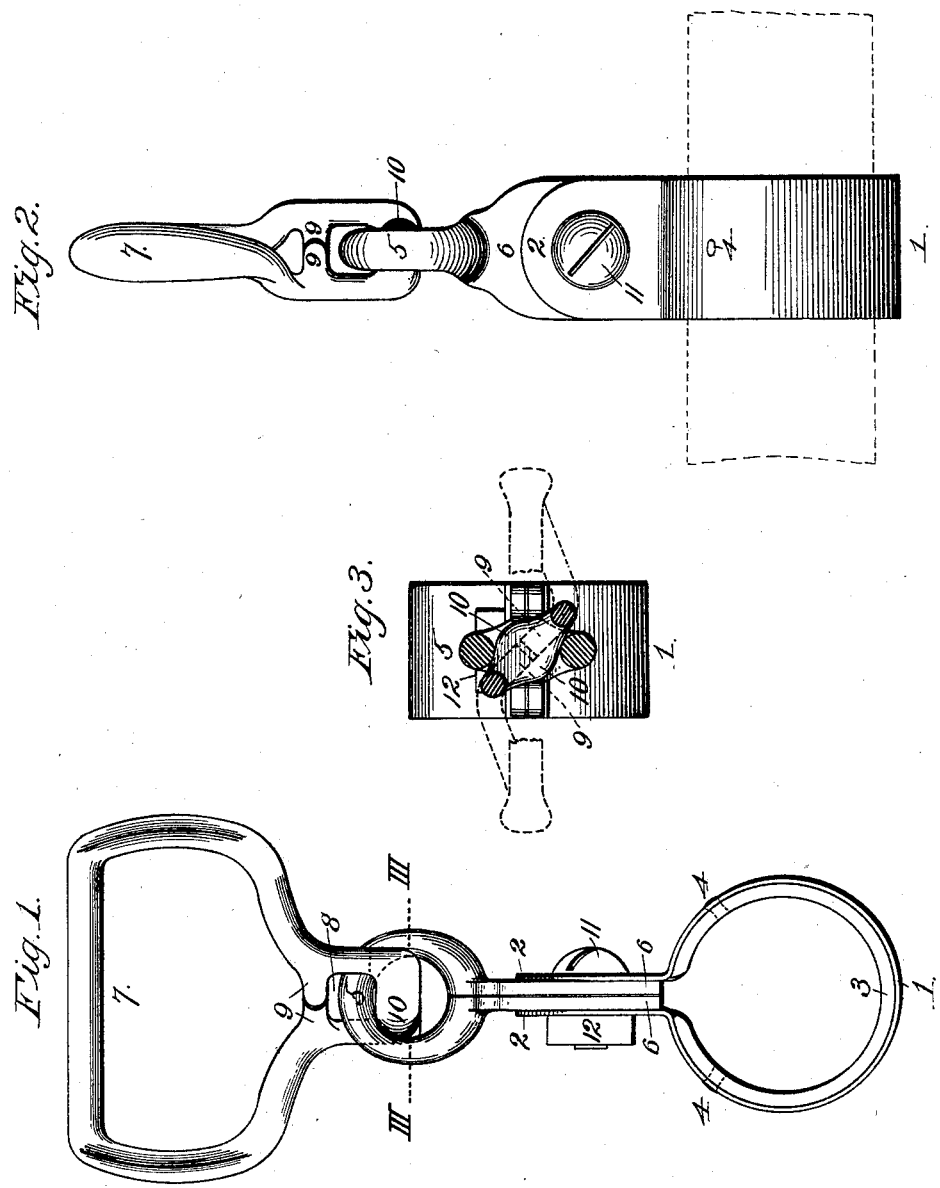
Witnesses:
F. G. Fischer
G. F. Thorpe
Inventor:
Swain Pearson.
By Higdon & Higdon
attys.

UNITED STATES PATENT OFFICE.

SWAIN PEARSON, OF ROCK ISLAND, ILLINOIS, ASSIGNOR OF ONE-HALF TO W. W. HARRIS, OF SAME PLACE.

NECK-YOKE ATTACHMENT.

SPECIFICATION forming part of Letters Patent No. 609,699, dated August 23, 1898.

Application filed April 4, 1898. Serial No. 676,493. (No model.)

*To all whom it may concern:*

Be it known that I, SWAIN PEARSON, of Rock Island, Rock Island county, Illinois, have invented certain new and useful Improvements in Neck-Yoke End Attachments, of which the following is a specification, reference being had to the accompanying drawings, forming a part thereof.

My invention relates to neck-yoke end attachments, and more particularly to devices for connecting the ends of the neck-yoke bar to the harness of the draft-animal, my object being to produce a device of this character which is adapted for use in connection with the customary leather strap which runs across the horse's breast from hame to hame or where the connecting-strap runs direct to the lower extremity of the horse-collar, which is simple, strong, durable, and cheap of manufacture, and which, of course, will obviate all chance of disconnection between the animal and the neck-yoke bar.

To this end the invention consists in certain novel and peculiar features of construction and combinations of parts, as will be hereinafter described and claimed, and in order that the invention may be fully understood I will proceed to describe it with reference to the accompanying drawings, in which—

Figure 1 represents a side view of the neck-yoke end attachment as arranged for use in connection with the style of harness embodying a strap running across the breast of the horse from hame to hame. Fig. 2 is a front view of the same. Fig. 3 is an irregular section taken on the line III III of Fig. 1, but with the strap-loop at the upper end of the device extending parallel with the neck-yoke bar-clasp instead of at right angles thereto, as shown at Figs. 1 and 2, and consequently adapted for use in connection with the style of harness embodying the strap running direct to the lower end of the collar.

In said drawings, 1 designates a spring-metal clasp provided with the oppositely-disposed arms 2. Said clasp is provided with a lining in the form of a leather washer 3 in order that it may be clamped tightly upon the neck-yoke bar (see dotted lines, Fig. 2) without injury to the "finish" of the leather, the lining or washer being held in place by rivets 4 or equivalent means.

5 designates a loop or eye provided with a pair of like arms 6, which are adapted to fit together and be clamped between the arms 2 2 of the spring-clasp, as hereinafter explained. This loop is of annealed malleable iron in order that its arms 6 6 may be pried or forced apart, for a purpose to be presently explained.

7 designates a strap-loop of substantially rectangular form with its upper bar straight. It is formed at its lower end with a loop 8, substantially rectangular in form and provided with rounded corners, and the upper side of said loop is formed by means of the bridging-prongs 9, said prongs extending from side to side of the small loop at its upper end, as shown in the drawings. When first constructed, these prongs extend substantially parallel to each other, so as to leave between them a space wide enough for the loop 5 to pass down between them, said loop being first arranged within the large loop 7 and straddled over the small loop, with its arms 6 spread apart, as hereinbefore explained. It is then drawn down until the loop engages the small loop 8, as shown in the drawings. The prongs 9 are then bent to the position shown, so as to prevent said loop from disengagement with the loop 8.

The loop 8, it should be stated, extends at an angle of forty-five degrees to the loop 7, as shown most clearly in Fig. 3. Consequently the loop 5 extends through the loop 8 in a diagonal direction and finds a bearing against its lower end at opposite sides of the rounded enlargements or projections 10, as shown most clearly in Fig. 3.

The advantage obtained by this construction and relation of parts resides in the fact that such parts have practically an independent universal movement with respect to each other and therefore materially relieve the strain upon the different parts—*i. e.*, the vehicle-pole, neck-yoke, and hames. The arms 6, as hereinbefore stated, fit between the arms 2 of the clasp 1, and extending through said bars and connecting them reliably together is a bolt 11, engaged at its threaded end with a nut 12.

As hereinbefore stated, the integrally-formed loops 7 and 8 extend at an angle of forty-five degrees to each other, so that by turning the upper member, which comprises said loops, a quarter of a revolution—that is, until its movement is arrested by the abutment of the vertical parts of loop 8 against opposite sides of loop 5—the strap-loop 7 may be arranged parallel with the clasp 1, as shown in Fig. 3, or at right angles to the same, as shown in Figs. 1 and 2.

When arranged at right angles, it is obvious that the "direct" strap, hereinbefore referred to, of the harness may be connected to the same without twisting said strap, which would be necessary if the loop extended parallel to the neck-yoke bar. On the other hand, when a "cross" strap connection is to be made it is desirable that the loop shall extend parallel to the clasp or neck-yoke bar in order to obviate twisting said strap. In either case the relation between the upper member and the loop 5 remains the same and permits great freedom of movement, and thereby forms practically a universally-flexible but indestructible connection between the ends of the neck-yoke and the harness of the animal.

The peculiar configuration of the loops, as shown, particularly the lower loop 8 of the upper member, with its rounded corners, is important where a particularly snug fit between parts 5 and 8 is made, and the rounded projections 10 of the part 8 are of importance in that they form a stronger and larger bearing-surface for the device and facilitate the free turning or swivel action.

From the above description it will be apparent that I have produced a neck-yoke end attachment which forms a positive and reliable connection between the neck-yoke bar and harness of the animal and which at the same time is, for all practical purposes, as flexible and therefore as free in its movement as a strap connection; and it is to be understood, of course, that changes in the form, proportion, detail construction, and arrangement of the parts which do not involve a departure from the spirit and scope of the invention, I reserve the right to make.

Having thus described the invention, what I claim as new, and desire to secure by Letters Patent, is—

1. In a neck-yoke end attachment, a member, comprising a pair of integrally-formed loops extending at an angle of forty-five degrees to each other, substantially as described.

2. In a neck-yoke end attachment, a member, comprising a pair of integrally-formed loops, one of them much smaller than the other and arranged centrally below and extending at an angle of forty-five degrees to the other, and provided centrally and at opposite sides of its lower end with rounded projections, substantially as described.

3. In a neck-yoke end attachment, a member, consisting of two integrally-formed loops extending at an angle of forty-five degrees to each other, with the upper side of the lower loop in the form of a pair of oppositely-disposed prongs, substantially as described.

4. In a neck-yoke end attachment, the combination with an upper member comprising a pair of integrally-formed loops which extend at an angle of forty-five degrees to each other, of a loop connected to the end of the neck-yoke bar and extending through the lower loop of the upper or first-named member, substantially as described.

5. In a neck-yoke end attachment, the combination with an upper member comprising a pair of integrally-formed loops which extend at an angle of forty-five degrees to each other, and a clasp for engagement with the end of the neck-yoke bar, of a loop, secured to the clasp and extending loosely through the lower loop of the upper member, substantially as described.

6. In a neck-yoke end attachment, the combination with an upper member, comprising a pair of integrally-formed loops to extend at an angle of forty-five degrees to each other, and a clasp for engagement with the end of the neck-yoke bar and provided with arms, of a loop engaging the lower loop of the upper member, and provided with arms fitting between the arms of the clasp, and a bolt and nut securing the arms of the loop between the arms of the clasp, substantially as described.

In testimony whereof I affix my signature in the presence of two witnesses.

SWAIN PEARSON.

Witnesses:
JNO. J. INGRAM,
W. W. HARRIS.